(12) United States Patent
Bhaskaran (10) Patent No.: US 7,394,856 B2
(45) Date of Patent: Jul. 1, 2008

(54) ADAPTIVE VIDEO PREFILTER

(75) Inventor: Vasudev Bhaskaran, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 850 days.

(21) Appl. No.: 10/666,668

(22) Filed: Sep. 19, 2003

(65) Prior Publication Data

US 2005/0063475 A1    Mar. 24, 2005

(51) Int. Cl.
*H04N 7/12* (2006.01)
(52) U.S. Cl. .............. 375/240.29; 348/620; 375/240.15
(58) Field of Classification Search ............... 348/136, 348/620, 416, 619, 413, 618, 608, 699, 390, 348/407, 384, 607, 711, 584, 588, 598, 586; 382/199, 242, 243, 213, 118, 190, 194, 203, 382/209, 221, 103, 284, 294, 154, 260, 265, 382/275, 233, 195, 205, 261, 262, 268, 266; 375/240.29, 240.08, 240.12, 240.16, 240.25
See application file for complete search history.

(56) References Cited

U.S. PATENT DOCUMENTS

| | | | |
|---|---|---|---|
| 4,561,022 A * | 12/1985 | Bayer ......................... | 348/622 |
| 5,253,059 A | 10/1993 | Ansari et al. | |
| 5,260,782 A * | 11/1993 | Hui ........................ | 375/240.15 |
| 5,363,213 A * | 11/1994 | Coward et al. .............. | 382/299 |
| 5,438,374 A * | 8/1995 | Yan .............................. | 348/620 |
| 5,552,829 A | 9/1996 | Kim et al. | |
| 5,847,766 A | 12/1998 | Peak | |
| 5,875,003 A | 2/1999 | Kato et al. | |
| 5,881,180 A | 3/1999 | Chang et al. | |
| 5,930,397 A | 7/1999 | Tsujii et al. | |
| 5,933,194 A | 8/1999 | Kim et al. | |
| 5,986,710 A | 11/1999 | Kim et al. | |
| 6,037,986 A | 3/2000 | Zhang et al. | |
| 6,041,145 A * | 3/2000 | Hayashi et al. ............. | 382/268 |
| 6,148,027 A | 11/2000 | Song et al. | |
| 6,175,592 B1 | 1/2001 | Kim et al. | |
| 6,269,123 B1 | 7/2001 | Fujishiro et al. | |
| 6,335,990 B1 * | 1/2002 | Chen et al. .................. | 382/261 |
| 6,356,592 B1 | 3/2002 | Naito | |
| 6,456,328 B1 | 9/2002 | Okada | |
| 2001/0005400 A1 | 6/2001 | Tsujii et al. | |
| 2001/0008544 A1 | 7/2001 | Ishiyama | |

(Continued)

OTHER PUBLICATIONS

*Pre And Post-Filtering For Low Bit-Rate Video Coding*, Nuno Vasconcelos & Frederic Dufaux, pp. 291-294.
*Edge Preserving Pre-Post Filtering For Low Bitrate Video Coding*, Hideaki Kimata, Yoshiyuki Yashima and Naoki Kobayashi, pp. 554-557.
Lai, Yung-Kai, et al., "Removal of Blocking Artifacts of DCT Transform by Classified Space-Frequency Filtering," Proceedings of ASIMOLAR-29, Oct. 1995, pp. 1457-1461.

*Primary Examiner*—Tung Vo
*Assistant Examiner*—Behrooz Senfi (57) ABSTRACT

A method for adaptively filtering a video signal prior to encoding is provided. The method initiates with calculating a local gradient indicative of a region type. Then, a weight factor is determined based upon the local gradient. Next, the weight factor is applied to a difference signal according to the region type. A computer readable media, an integrated circuit and a system for processing an image data signal are also provided.

21 Claims, 9 Drawing Sheets

U.S. PATENT DOCUMENTS

| | | |
|---|---|---|
| 2001/0019588 A1 | 9/2001 | Naito et al. |
| 2001/0035969 A1 | 11/2001 | Kishimoto |
| 2002/0054637 A1 | 5/2002 | Kato |
| 2002/0054639 A1 | 5/2002 | Kawashima et al. |
| 2002/0064228 A1 | 5/2002 | Sethuraman et al. |
| 2002/0094130 A1 | 7/2002 | Bruls et al. |
| 2002/0150166 A1 | 10/2002 | Johnson |
| 2002/0191858 A1 | 12/2002 | Sindhu |
| 2004/0032906 A1* | 2/2004 | Lillig .................... 375/240.08 |
| 2004/0037465 A1* | 2/2004 | Krause ....................... 382/199 |

* cited by examiner

| (-1,-1) | (-1,0) | (-1,1) |
| (0,-1)  | (x,y)  | (0,1)  |
| (1,-1)  | (1,0)  | (1,1)  |

ADAPTIVE VIDEO PREFILTER

CROSS REFERENCE TO RELATED APPLICATIONS

This application is related to U.S. patent application Ser. No. 10/355,469, entitled "METHOD AND APPARATUS FOR DCT DOMAIN FILTERING FOR BLOCK BASED ENCODING." This application is hereby incorporated by reference in its entirety for all purposes.

BACKGROUND OF THE INVENTION

1. Field of the Invention

This invention relates generally to video processing and more particularly to a method and apparatus for pre-processing a video signal prior to encoding to improve a codec's efficiency while simultaneously reducing the effects of noise present in the video signal being encoded.

2. Description of the Related Art

Transmission of video data has become more popular as network bandwidth has increased to handle the bandwidth required for video data having an acceptable quality level. Video data requires a high bandwidth, i.e., many bytes of information per second. Therefore, video compression or video coding technology reduces the bandwidth requirements prior to transmission of the video data. However, the compression of the video data may negatively impact the image quality when the compressed video data is decompressed for presentation. For example, block based video compression schemes, such as Motion Picture Expert Group (MPEG) coding standard, suffer from blocking artifacts which become visible at the boundaries between blocks of a frame of the video image.

Figure 1:
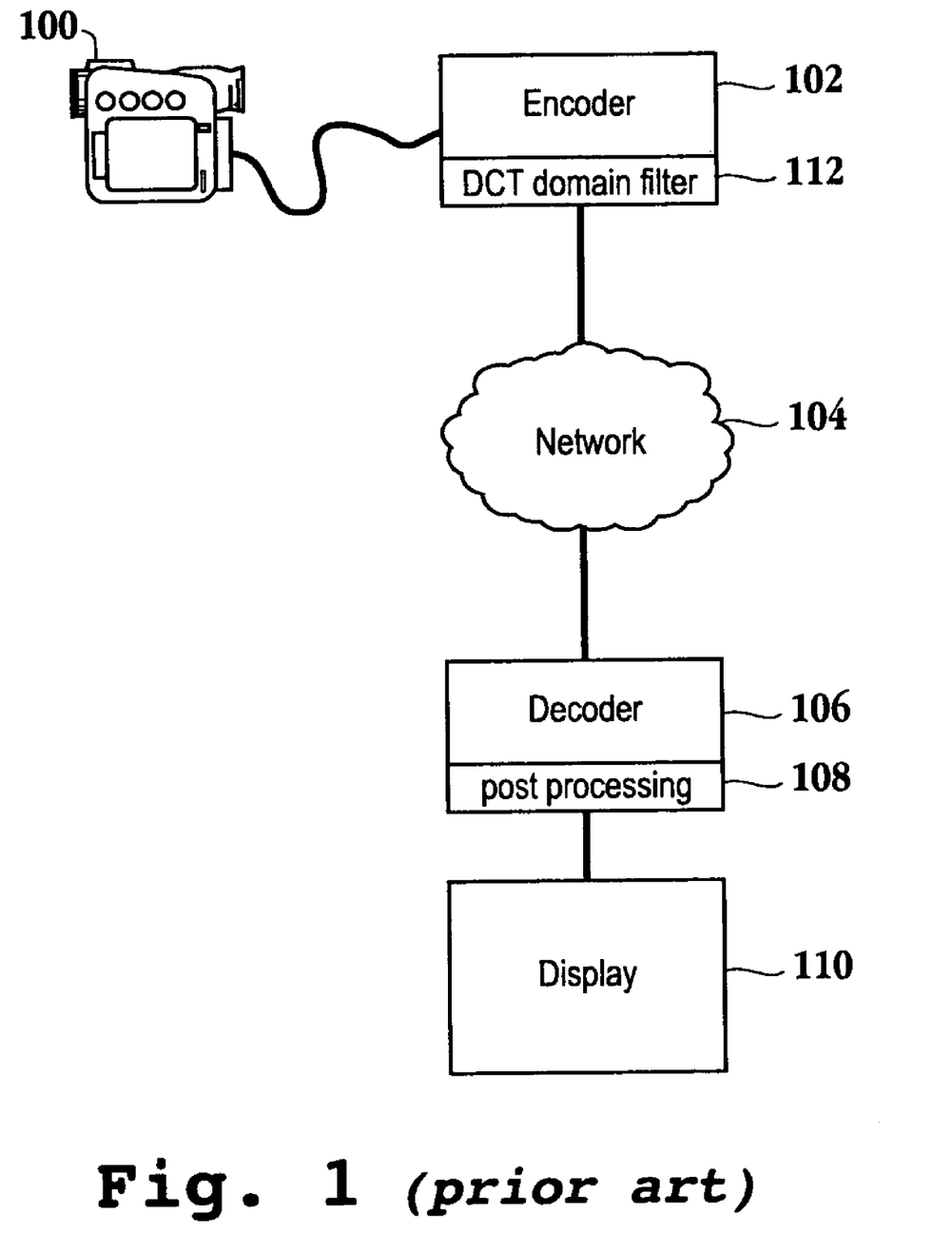
FIG. 1 is a simplified schematic diagram of a video coding system.

FIG. 1 is a simplified schematic diagram of a video coding system. Video capture device 100 captures image data. The image data is then compressed according to a compression standard through encoder 102. The compressed image data is then transmitted over network 104 to decoder 106. Decoder 106 may include post-processing block 108, which is configured to compensate for blocky artifacts. The decompressed image data that has been post processed is then presented on display monitor 110. Alternatively, placement of the processing block configured to compensate for blocky artifacts may be within encoder 102. Here, DCT domain filter 112 is included within encoder 102 to reduce blocky artifacts introduced during compression operations.

Thus, post-processing block 108 includes the capability to offset blocky artifacts, e.g., low pass filters applied to the spatial domain attempt to compensate for the artifacts introduced through the compression standard. However, one shortcoming with current post-processing steps is their computational complexity, which requires about 30-50% of the total computational power needed in the decoder, not to mention the dedication of compute cycles for post-processing functions. It should be appreciated that this type of power drain is unacceptably high for mobile terminals, i.e., battery enabled consumer electronics, such as terminals incorporating thin film transistors (TFT) technology, super-twisted nematic (STN), and mobile digital-thin film diode (MD-TFD). Another shortcoming of the low pass filters currently being used is that the amount of time for the filtering operation may cause a noticeable delay in the presentation of the image. This delay is especially noticeable with respect to portable electronic computing systems due to the limited resources of the embedded systems controlling these devices.

The current in-loop filtering represented through FIG. 1 is not capable of effectively handling noise introduced into the encoder loop from the input device in addition to smoothing blocky artifacts. Furthermore, since the noise from the input device tends to be random, the motion tracker of the encoder is fooled into following noise rather than the actual signal. For example, the motion tracker may take a signal at time t and then finds a location where the difference is close to 0. Thereafter, the motion tracker outputs a motion vector and the difference. However, random noise causes the difference to become the difference between the signal and the noise rather than the difference between the true motion. Thus, if the motion vector is dominant, then everything becomes influenced by noise rather than the actual signal.

As a result, there is a need to solve the problems of the prior art to provide a method and system for reducing input device generated noise from a video signal prior to the video signal being received by the encoder.

SUMMARY OF THE INVENTION

Broadly speaking, the present invention fills these needs by providing a prefilter configured to adaptively apply a smoothing function to video data in addition to reducing noise generated from a device transmitting the video data. It should be appreciated that the present invention can be implemented in numerous ways, including as a method, a system, computer readable media or a device. Several inventive embodiments of the present invention are described below.

In one embodiment, a method for improving image quality while reducing a bit rate associated with a video signal is provided. The method initiates with defining a neighborhood of pixel locations around a pixel. Then, a difference between each pixel value associated with the neighborhood of pixel locations and a pixel value of the pixel is calculated. Next, a smoothing filter is defined. Then, it is determined whether to apply the smoothing filter to the pixel according to a weight factor associated with the difference.

In another embodiment, a method for adaptively filtering a video signal prior to encoding is provided. The method initiates with calculating a local gradient indicative of a region type. Then, a weight factor is determined based upon the local gradient. Next, the weight factor is applied to a difference signal according to the region type.

In yet another embodiment, a method for processing a video signal prior to encoding is provided. The method initiates with defining a neighborhood of pixel locations around a pixel. Then, a gradient is calculated between each neighborhood pixel and the pixel. Next, a gradient summation associated with the pixel is computed. Then, the pixel is classified as either a noise pixel or a non-noise pixel based upon the gradient summation.

In still yet another embodiment, a computer readable medium having program instructions for improving image quality while reducing a bit rate associated with a video signal is provided. The computer readable medium includes program instructions for defining a neighborhood of pixel locations around a pixel. Program instructions for calculating a difference between each pixel value associated with the neighborhood of pixel locations and a pixel value of the pixel and program instructions for defining a smoothing filter are included. Program instructions for determining whether to apply the smoothing filter to the pixel according to a weight factor associated with the difference are provided.

In another embodiment, a computer readable medium for adaptively filtering a video signal prior to encoding is provided. The computer readable medium includes program instructions for calculating a local gradient indicative of a region type. Program instructions for determining a weighting factor based upon the local gradient are provided. Program instructions for applying the weighting factor to a difference signal according to the region type are included.

In yet another embodiment, a computer readable medium having program instructions for processing a video signal prior to encoding is provided. The computer readable medium includes program instructions for defining a neighborhood of pixel locations around a pixel. Program instructions for calculating a gradient between each neighborhood pixel and the pixel and program instructions for computing a gradient summation associated with the pixel are included. Program instructions for classifying the pixel as either a noise pixel or a non-noise pixel based upon the gradient summation are also included.

In still yet another embodiment, an integrated circuit is provided. The integrated circuit includes circuitry for filtering a signal prior to transmission to an encoding loop. The circuitry for filtering includes, circuitry for calculating a gradient between a pixel value and a neighboring pixel value associated with the signal and circuitry for determining a weight factor based upon the local gradient. The circuitry for filtering also includes circuitry for applying the weight factor to a difference signal according to the region type.

In another embodiment, a system for processing an image data signal is provided. The system includes a prefilter configured to adaptively apply a smoothing function according to a gradient value. The gradient value represents a degree of difference between a value associated with a pixel and a neighborhood of pixel values around the pixel, wherein the degree of difference determines an extent of the smoothing function applied to the image data signal. The system includes an encoder configured to receive a processed signal from the prefilter.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a system, apparatus and method which preprocesses a video signal prior to encoding the signal. It will be obvious, however, to one skilled in the art, that the present invention may be practiced without some or all of these specific details. In other instances, well known process operations have not been described in detail in order not to unnecessarily obscure the present invention. FIG. 1 is described in the "Background of the Invention" section.

The embodiments described herein provide a method and apparatus for applying an adaptive prefilter capable of computing output as a weighted sum of edge image data and smoothed image. In one embodiment, edge regions are detected and the adaptive prefilter is enabled or disabled, based upon the strength associated with the edge region. When the adaptive prefilter is enabled, the amount of smoothing may be modulated based upon a gradient calculation that is indicative of a region type. In another embodiment, the weighting is controlled by whether the image data is classified as being either noisy or not noisy. As the prefilter is more closely associated with an input device, e.g., a camera, it should be appreciated that the prefilter may be configured to more effectively remove noise associated with the input device. Thus, the codec may be adjusted to focus on artifacts caused from the codec itself, e.g., blockiness, without having to be configured to remove blockiness and input device generated noise. As a result of using the adaptive prefilter prior to encoding, the codec does not have to work as hard, i.e., becomes more efficient. Furthermore, the coded data rate may be controlled through the application of filtering prior to coding. In one embodiment, the filtering scheme determines noisy regions of the image data and adapts the filter accordingly.

Figure 2:
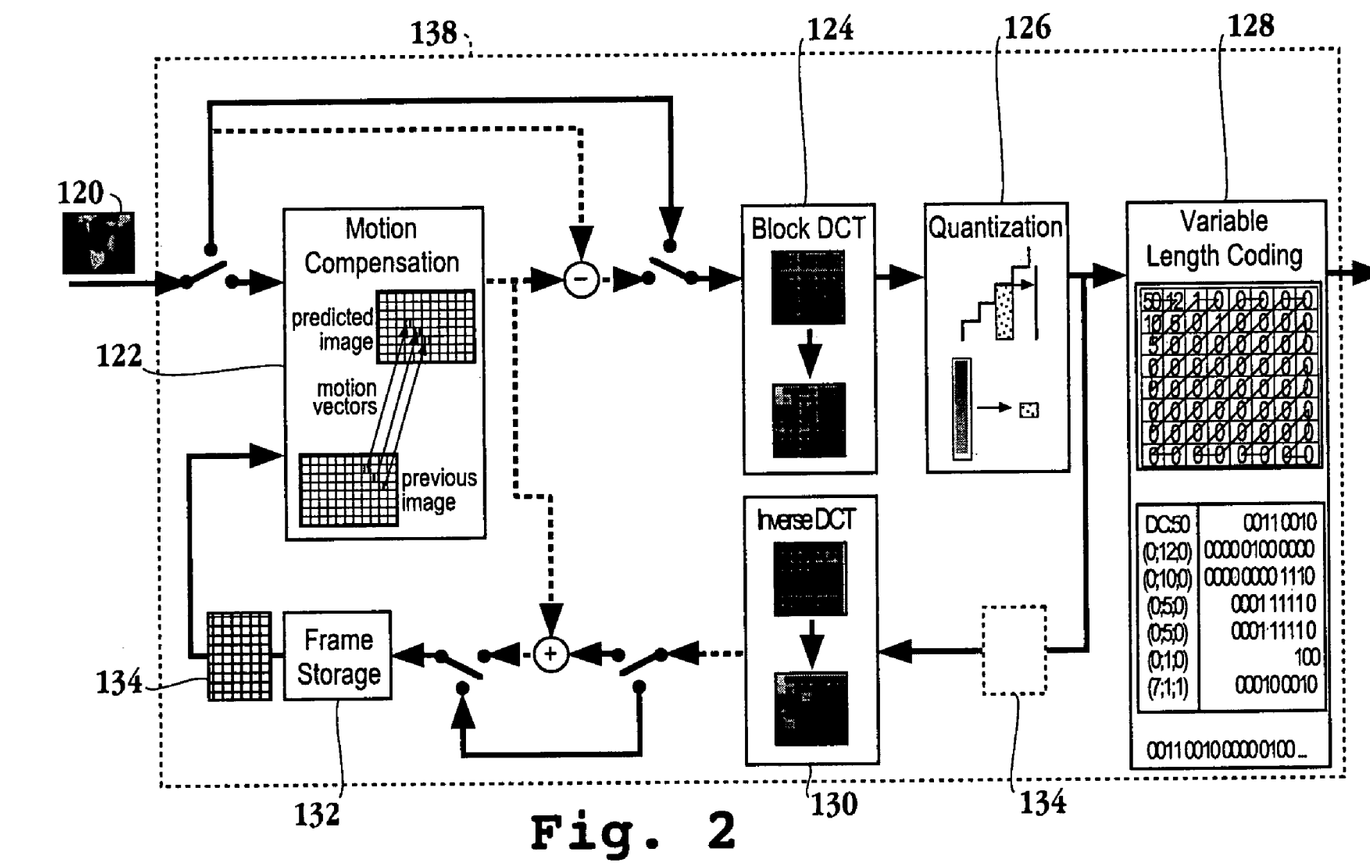
FIG. 2 is a simplified schematic diagram of an encoding loop having in-loop filtering.

FIG. 2 is a simplified schematic diagram of an encoding loop having in-loop filtering. Video signal 120 is received by encoder 138. Received video signal 120 is delivered to motion compensation module 122. As is generally known, motion compensation module 122 uses blocks from a past frame to construct a replica of the current frame. In video coding standards such as MPEG-1, MPEG-2, H.261, H.263 or MPEG-4, the blocks are defined by pixels within a 16×16 region. For each block in a current frame, a matching block is found in the past frame and a motion vector corresponding to the location of this matching block is then incorporated into the encoding of the block in the current frame. Since video data does not change very much from frame to frame, the prediction error which is computed as the difference between the block in the current frame and the matching block in the previous frame, will be quite small and these error values compress better than the actual pixel values of the block in the current frame. Discrete cosine transform (DCT) block 124 is then applied to each 8×8 block that has undergone the motion compensation process. Here, the ordinary two-dimensional spatial representation of the picture (or video frame) is converted into another set of dimensions, such as frequency, in which some of the data may be selectively eliminated without severely degrading the quality of the image. With respect to DCT, this transform converts the image or video frame to frequency space. As is generally known, most natural images contain very little high frequency information, since most of the picture information is concentrated in the low-frequency coefficients of the transform data. The output of DCT block 124 is then transmitted to quantization block 126. In quantization block 126, the data is further compacted by reducing to zero the smaller values at high frequencies within the data output from block 124.

Still referring to FIG. 2, the output of quantization block 126 is then delivered to variable length coding block 128. Here, a lossless process of data compaction is performed. For example, variable length coding block 128 may replace consecutive identical digits, which are usually zeros, with the number of consecutive digits and their corresponding value. Output from quantization block 126 is also delivered to inverse DCT block 130. Inverse DCT block 130 is configured to decompress the files created through DCT block 124. The decompressed data is then stored in frame storage 132. Thus, the past frame stored in frame storage 132 may be utilized for motion compensation purposes. Attempts to reduce blocky artifacts associated with DCT compression algorithms include the utilization of DCT domain filter 134 within the encoding loop. For example, DCT domain filter 134 may be located prior to inverse DCT block 130. Alternatively, DCT domain filter 134 may be located before or after frame storage 132. Further details on DCT domain filter may be found in U.S. patent application Ser. No. 10/355,469 which has been incorporated by reference for all purposes. It should be appreciated that DCT domain filter 134 is being hit with the input device noise as well as blocky artifacts generated from the compression of data within encoding loop 138. Accordingly, it is difficult to have DCT domain filter 134 control both types of noise. That is, DCT domain filter 134 may be adequate for smoothing blockiness and in the process, the DCT domain filter may smooth some noise. However, the noise from the input device is not explicit. In other words, DCT domain filter 134 does not have enough degrees of freedom to effectively remove the input device noise.

It should be appreciated that the embodiments described herein may be used in conjunction with a suitable DCT domain filter, as described above. Additionally, it will be apparent to one skilled in the art that any suitable encoder may be used with the adaptive prefilter described herein. That is, since the prefilter is outside of the encoding loop, there are no modifications required for the encoding loop to include the adaptive prefilter. Moreover, while the input device described herein is typically referred to as a camera, the invention is not limited to a prefilter used to preprocess a video signal from a camera. That is, any suitable image capture device, e.g., camcorder, web cam, cell phone with a camera included, etc., capable of generating a video signal to be processed by a codec may include the prefilter described herein. It should be appreciated that low end cameras tend to generate more sensor associated noise, which may be due to the analog to digital conversion process, where a low end camera generally functions at 384 kilobits per second and lower. Thus, in one embodiment, the adaptive prefilter is most effective with low-end cameras. However, the prefilter may be used with any suitable camera or input device and is not restricted to a particular transmission speed.

Figure 3:
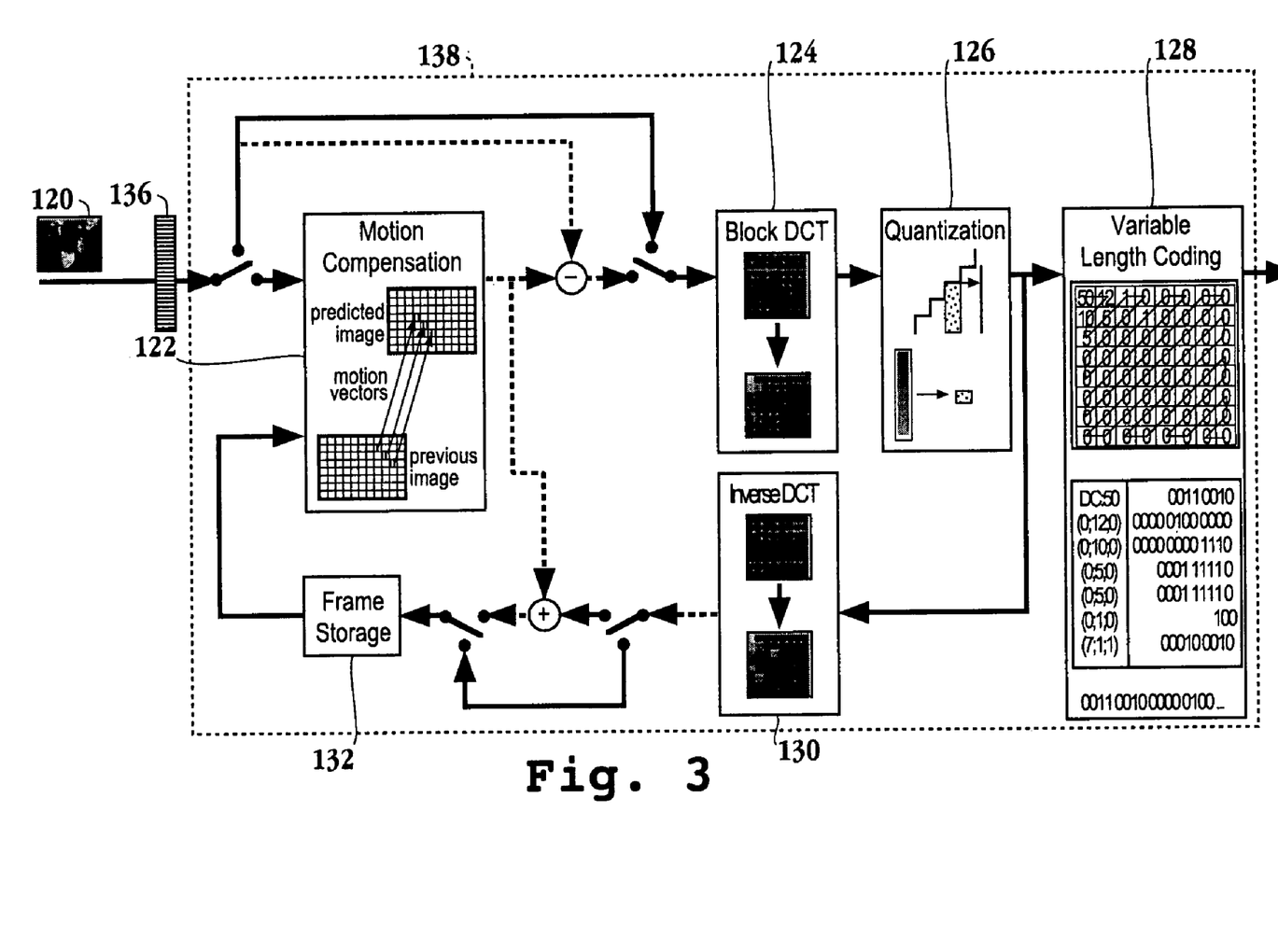
FIG. 3 is a simplified schematic diagram illustrating the video signal being pre-processed through a filter prior to being delivered to an encoding loop in accordance with one embodiment of the invention.

FIG. 3 is a simplified schematic diagram illustrating the video signal being pre-processed through a filter prior to being delivered to an encoding loop in accordance with one embodiment of the invention. Here, encoding loop 138 is equivalent to the encoding loop discussed above with reference to FIG. 2. However, video signal 120 is being pre-processed through prefilter 136. Here, prefilter 136 is more closely coupled to the input device, i.e., camera or some other suitable image capture device, and consequently is more effective in reducing the input device noise. Furthermore, the pre-processor does not require any changes being made to the encoding loop, as is necessary with an in loop filter. Therefore, prefilter 136 may be applied to any generic encoding device. As will be explained in more detail below, by filtering video signal 120 prior to the encoding loop, better control of the coded data rate may also be achieved.

Figure 4:
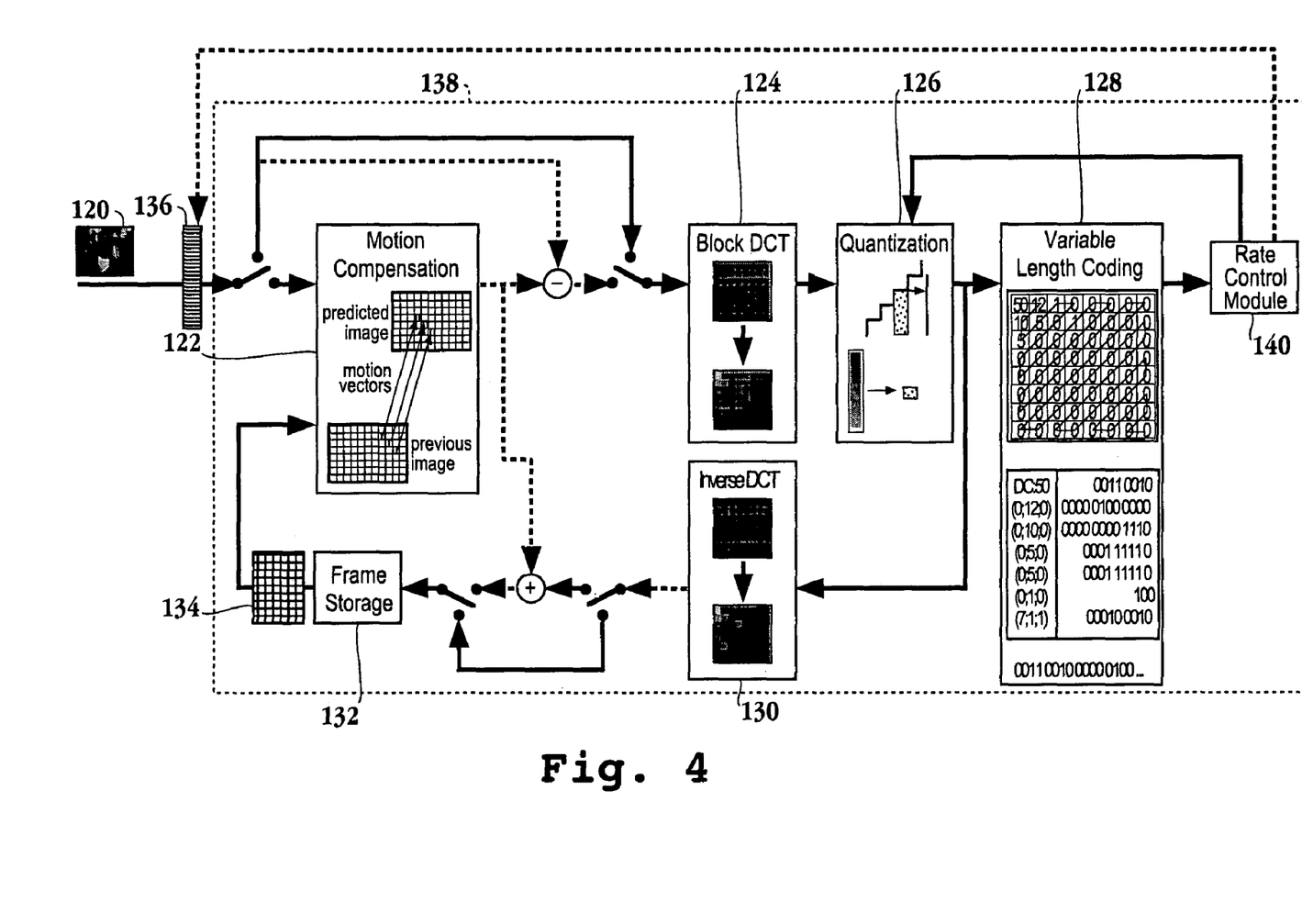
FIG. 4 is an alternative embodiment of the pre-processing filter and encoding loop described with reference to FIG. 3.

FIG. 4 is an alternative embodiment of the pre-processing filter and encoding loop described with reference to FIG. 3. Here, encoder 138 includes DCT domain filter 134. As stated above, further details concerning the configuration of DCT domain filter 134 may be found in U.S. patent application Ser. No. 10/355,469. Of course, DCT domain filter 134 may be placed prior to frame storage 132 or prior to inverse DCT block 130 as illustrated with reference to FIG. 2. Encoder 138 also includes rate control module 140. Rate control module 140 is configured to further smooth a picture through prefilter 136, thereby reducing the number of bits. Thus, rate control module 140 enables filter 136 to be used to reduce the overall bit rate of the codec. One skilled in the art will appreciate that a smoothing filter reduces the number of bits, therefore, rate control module 140 may require additional smoothing should encoder 138, through quantization block 126, send a signal that the bit rate should be decreased.

Figure 5:
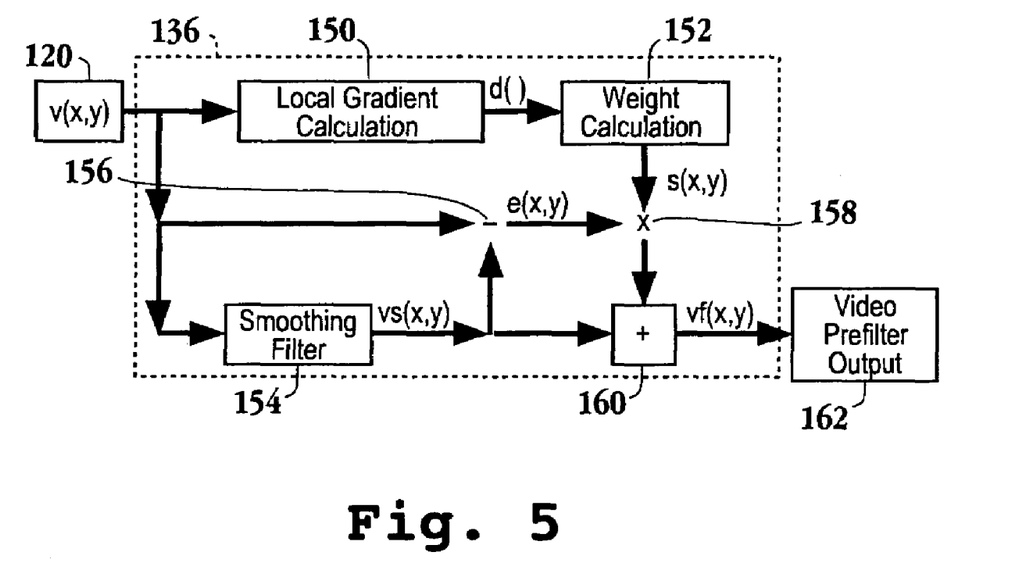
FIG. 5 is a more detailed schematic diagram of the configuration of prefilter 136 in accordance with one embodiment of the invention.
Figure 6:
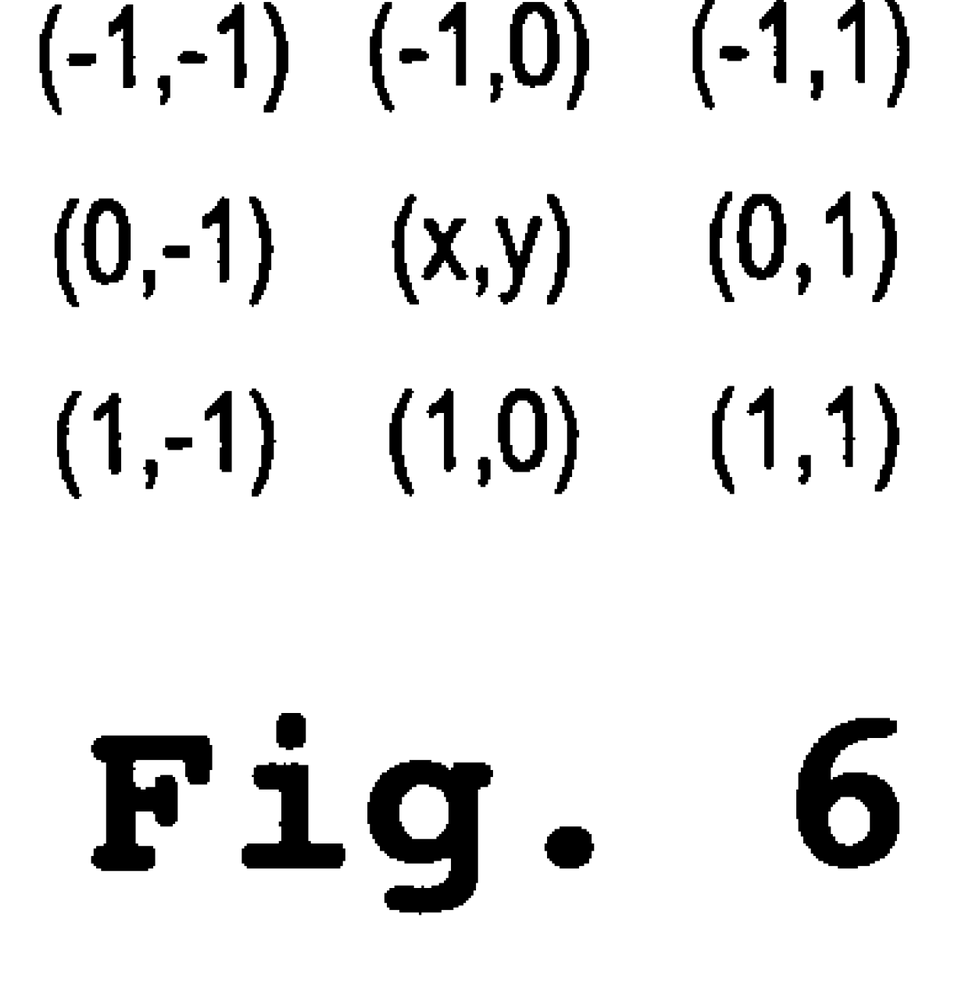
FIG. 6 is an illustrative representation of a K×L neighborhood defined around pixel (x,y).

FIG. 5 is a more detailed schematic diagram of the configuration of prefilter 136 in accordance with one embodiment of the invention. Video input signal 120 is delivered to local gradient calculation module 150. Local gradient calculation module 150 is configured to calculate a local gradient relative to a particular pixel. The local gradient represents the difference between a neighborhood of pixels defined around the pixel. FIG. 6 is an illustrative representation of a K×L neighborhood defined around pixel (x,y). Here, a 3×3 neighborhood is defined around pixel (x,y) for illustrative purposes only. Thus, the local gradient for the pixel having coordinates (x,y) is the difference between each of the eight locations in the 3×3 neighborhood and the pixel having coordinates (x,y) of FIG. 6. For example, if the neighborhood is the 3×3 neighborhood depicted in FIG. 6, then the local gradient may be mathematically represented as:

$$d(p,q)=v(x,y)-v(p,q) \text{ [}(p,q) \text{ are pixel indices within the } K \times L \text{ neighborhood] where:}$$

$$d(-1,1)=v(x,y)-v(x-1,y-1)$$

$$d(-1,0)=v(x,y)-v(x-1,y)$$

$$d(-1,1)=v(x,y)-v(x-1,y+1)$$

$$d(0,-1)=v(x,y)-v(x,y-1)$$

$$d(0,1)=v(x,y)-v(x,y+1)$$

$$d(1,-1)=v(x,y)-v(x+1,y-1)$$

$$d(1,0)=v(x,y)-v(x+1,y)$$

$$d(1,1)=v(x,y)-v(x+1,y+1)$$

Returning to FIG. 5 each of the differences calculated through local gradient calculation module 150 is transmitted to weight calculation module 152. Weight calculation module 152 computes a smoothing factor s(x,y). It should be appreciated that the smoothing factor acts as a weighting factor for a difference signal e(x,y). As will be explained in more detail below, the weighting factor enables the filter to differentiate between region types, i.e., a smooth region or an edge region, in order to adaptively apply a smoothing filter. It should be further appreciated that the smoothing filter is applied in smooth regions, while in edge regions, the smoothing filter is turned off, in one embodiment. Smoothing filter module 154 of FIG. 5 receives the input pixel v(x,y) and outputs a smoothed pixel vs(x,y). It will be apparent to one skilled in the art that any suitable smoothing filter may be utilized to generate vs(x,y) from v(x,y). For example, known smoothing techniques, such as an averaging filter, median filter, etc., may be used to generate vs(x,y) from v(x,y). Module 156 represents the difference signal e(x,y), i.e., the input signal v(x,y) minus the smoothing signal vs(x,y). The difference signal e(x,y) is combined with the weighting factor s(x,y). The product of the difference signal and the smoothing factor is then added to the output of the smoothing filter vs(x,y). This result then yields the filtered signal vf(x,y), also referred to as video filter output 162. In mathematical terms, the relationship depicted by FIG. 5 is:

$$vf(x,y)=vs(x,y)+s(x,y) \times e(x,y) \quad [1]$$

Weight calculation module 152 takes into account the net effect of all of the gradients. Weight calculation module 152 includes a normalization process in order to normalize the calculated weight between zero and one. Thus, a weight factor of zero translates to a video prefilter output which is the result of the smoothing filter only. That is, the gradient is small which is indicative of a smooth region of image data. When the weight factor is one or close to one, i.e., the gradient is large, thereby indicating that the pixel in question is part of an edge region. Therefore, the difference signal e(x,y) is dominant when the gradient is large. In other words, in an edge region the smoothing filter is turned off and the output vf(x,y) is equal to the input v(x,y). Accordingly, FIG. 5 may be thought of as a scheme for switching output between either a smoothed output or the original output. The local gradient calculation may be thought of as yielding a bunch of distances or gradients. A mapping function F(d) is then used to calculate numbers for each of the distances and then sum the numbers and divide by the number of neighbors in order to normalize the summed number. In other words, the weight calculation is a mapping from distance d to F(d) where F(d) is then normalized to obtain the smoothing factor. In mathematical terms, weighting factor s(x,y) may be represented as:

$$s(x,y)=\\(1/n) \text{ sum (pixels in } K \times L \text{ neighborhood)} f(d(p,q)) \quad [2]$$

with reference to the local gradient calculation above, $$s(x,y)=1/8[f(d(-1,-1))+f(d(-1,0))+f(d(-1,1))+\\f(d(0,-1))+f(d(0,1))+f(d(1,-1))+f(d(1,0))+\\f(d(1,1))$$

where, f(d) is defined as:

$$f(d)=1-[1+d^2/R^2]^{-1} \quad [3]$$

Therefore, in smooth regions, since d(p,q) is close to zero, f(d) is also close to zero and thus the prefilter output is the smoothing filter output. On the other hand, in edge regions, s(x,y) is non zero and f(d) may have a value close to 1. Thus, the difference signal e(x, y) plays a greater role in the prefilter output. In other words, the effect of global smoothing is de-emphasized in edge regions. It should be appreciated that the edge smoothing may be controlled using the factor R of Equation 3. In one embodiment, a larger R means heavier smoothing and this will lead to a higher compression ratio. Therefore, R may be used to control the smoothing and hence the codec's output bit rate. Additionally, the weighing function may be changed by changing the profile of f(d). Equation 3 represents f(d) is a concave function that is symmetric around 0 and is in the range 0-1, where the factor R is analogous to a damping factor on d. It should be appreciated that equation 3 is an exemplary equation and not meant to be limiting as any suitable equation where F(d) is equal to 0 when d equals zero, F(d) is equal to 1 when d is large, F(d) is a positive value and F(d) is equal to F(−d). For example, $F(d)=1-[1+|d|/R]^{-1}$ in another embodiment. By changing the value of R, a family of curves may be generated that graphically illustrate d and F(d). In one embodiment, R has a value between about 4 and about 20. In another embodiment, a user may select a value for R.

In one embodiment, the rate control module with reference to FIG. 4 is configured to influence the factor R. That is, where the rate control module detects a bit rate that is too high, the rate control module may signal to increase the factor R, which results in F(d) becoming closer to zero. As a consequence of F(d) becoming closer to zero, more smoothing occurs which reduces the bit rate.

Figure 7:
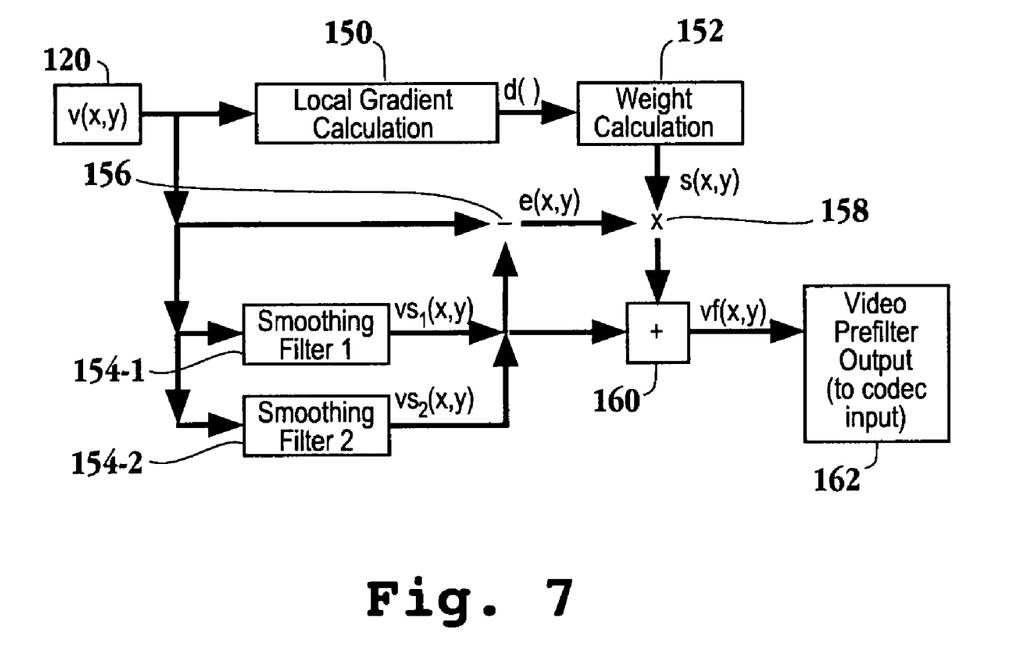
FIG. 7 is an alternative embodiment of the filter used prior to encoding illustrated in FIG. 5.

FIG. 7 is an alternative embodiment of the filter used prior to encoding illustrated in FIG. 5. Here, two smoothing filters are included in the weight calculation module 136. In one embodiment, the smoothing filters can have varying degrees of smoothing applied. Thus, if it is determined that the pixel is a noise pixel due to a very large gradient, a heavy smoothing filter may be applied in order to further smooth the noise pixel. Thus, smoothing filter 1 154-1 may have a lighter degree of smoothing applied while smoothing filter 2 154-2 may result in a heavier smoothing algorithm being applied.

In one embodiment, a denoising scheme may be employed with the prefilter in order to reduce noise as well as reducing the overall bit rate of the codec as discussed above. Here, weight calculation module 152 is modified to include the denoising functionality. A threshold (T) is established and a function C(p,q) is defined, where C(p,q)=1 if |d(p,q)|>=T or C(p,q)=0 elsewhere. The term NC is defined as the sum of all C(p,q) in the K×L neighborhood. Thus, if NC is greater than a predefined value (referred to as NCMIN) and if all signs of d(p,q) are identical, then v(x,y) is classified as a noise pixel, wherein s(x,y) is set to zero. Consequently, the pre filter's output becomes the smoothing filter's output when noise is detected. Here, smoothing filter 2 154-2 may be used to smooth a value associated with a noise pixel. Additionally, the degree of noise reduction may be achieved by changing the parameters (T, NCMIN). Accordingly, adaptive pre filter 136 is defined using equation 1 above and the parameters R, K, L, T, and NCMIN. For a 3×3 neighborhood where K=L=3, R is between about 4 and about 20, T=20 and NCMIN=7, the adaptive prefilter was able to reduce the overall bit rate by about 20-30% for a fixed quantizer setting in the transform domain video coder (H.263). Moreover, if random noise is present in the original video signal, the prefilter extension discussed above reduces the effect of noise in the decoded video without degrading image quality. It should be appreciated that the above list of values for the parameters is exemplary and not meant to be limiting, as the parameters may have any suitable value. In addition, with respect to the neighborhood size, K and L do not have to be equal as the neighborhood may be defined as any suitable size, e.g., 3×5, 5×3, 5×5, etc.

Figure 8:
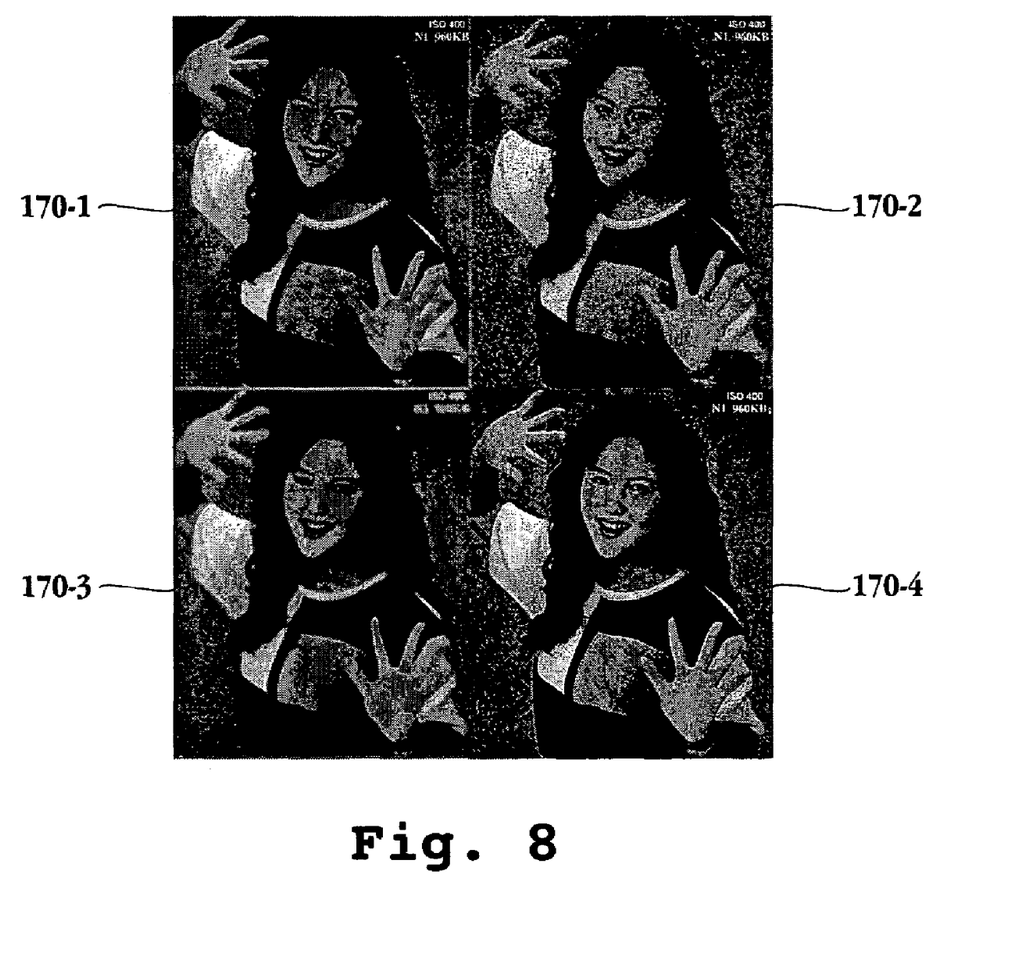
FIG. 8 is an exemplary illustration of the impact on output image signals by the adaptive prefilter discussed above in accordance with one embodiment of the invention.

FIG. 8 is an exemplary illustration of the impact on output image signals by the adaptive prefilter discussed above in accordance with one embodiment of the invention. Here, image 170-1 is an ideal noise-free image from a high-end camera. Image 170-2 is a typical output from a noisy camera, or low end camera. Thus, image 170-2 may represent an input signal v(x,y) into the filter embodiments described herein. Image 170-3 represents the smoothed filter output version of image 170-2. As can be seen, image 170-3 tends to be a little bit blurred. That is, the sharp transitions in edge regions have been blurred through the global smoothing. Image 170-4 is the output of the adaptive pre-processor filter vf(x,y) achieved through the embodiments described herein. As illustrated, image 170-4 appears sharper than image 170-3 while having less graininess than compared to image 170-2.

Figure 9:
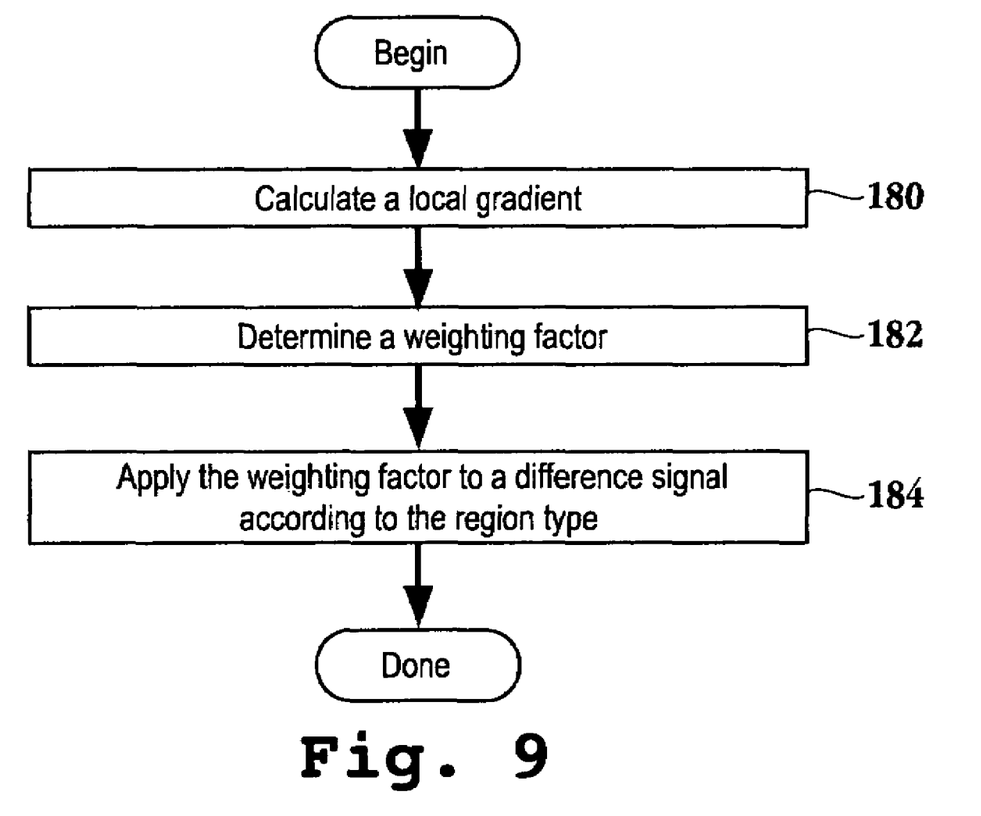
FIG. 9 is a method flow chart illustrating the method operations for adaptively filtering the video signal prior to encoding in accordance with one embodiment of the invention.

FIG. 9 is a method flow chart illustrating the method operations for adaptively filtering the video signal prior to encoding in accordance with one embodiment of the invention. The method initiates with operation 180 where a local gradient indicative of a region type is calculated. Here, a neighborhood of pixels is defined around a selected pixel. The local gradient is determined by taking the difference between each pixel of the neighborhood and the selected pixel. A relatively large local gradient is indicative of an edge region, while a relatively small local gradient is indicative of a smooth region. The method then advances to operation 182 where a weighting factor based upon the local gradient is determined. Here, the differences between each pixel of the neighborhood and the selected pixel are then summed and normalized as described above. In one embodiment, the denoising scheme discussed above is included here to identify and subsequently filter noise pixels. The method then proceeds to operation 184 where the weighting factor is applied to a difference signal according to the region type. That is, a weighting factor of 1 or close to 1 results in the difference signal dominating due to an edge region being identified. Thus, the prefilter output is close to the prefilter input, i.e., the smoothing filter is "tuned off" or minimized. On the other hand, a weighting factor of 0, or close to 0, implies a smooth region where the prefilter output vf(x,y) is close to the smoothed signal vs(x,y).

In summary, the above described invention provides for an adaptive prefilter capable of switching output between either a smoothed output, the original output or somewhere in between the smoothed output and the original output based upon a local gradient. In one embodiment, a noise pixel is identified when the gradient is too large relative to a threshold. The noise pixel is processed through a smoothing filter to improve image quality while reducing the bit rate through the smoothing. Thus, by utilizing the adaptive prefilter described herein, noise generally associated with less expensive cameras used for videoconferencing applications or an other suitable applications, may be reduced along with the bit rate associated with the video data.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for adaptively filtering a video signal prior to encoding, comprising:
    calculating a local gradient indicative of a region type within a single frame of the video signal, the region type being one of an edge region or a smooth region;
    determining a weight factor based upon the local gradient; and
    applying the weight factor to a difference signal according to the region type, the difference signal representing a difference between the single frame of the video signal and an output of a smoothing filter which data representing the single frame of the video signal passes.

2. The method of claim 1, wherein the method operation of calculating a local gradient indicative of a region type includes,
    defining a neighborhood of values around a current pixel value; and
    quantifying a difference between each of the neighborhood of values and the current pixel value.

3. The method of claim 2 further comprising:
    comparing the difference to a threshold value; and
    applying a smoothing function to the current pixel value when the difference is greater than the threshold value.

4. The method of claim 1, further comprising:
    applying the smoothing filter to the video signal;
    calculating the difference between the video signal and an output of the smoothing filter; and
    representing the difference between the video signal and the output of the smoothing filter as the difference signal.

5. The method of claim 1, further comprising:
    receiving a signal to reduce a bit rate; and
    in response to receiving the signal the method includes,
    applying a smoothing filter to the video signal.

6. The method of claim 1, wherein the method operation of applying the weight factor to a difference signal according to the region type includes,
    constructing the weight factor in a manner such that a higher weight factor diminishes a contribution of a smoothing filter.

7. A computer readable medium having physically stored thereon computer program instructions for adaptively filtering a video signal prior to encoding, comprising:
    program instructions for calculating a local gradient indicative of a region type within a single frame of the video signal, the region type being one of an edge region or a smooth region;
    program instructions for determining a weighting factor based upon the local gradient; and
    program instructions for applying the weighting factor to a difference signal according to the region type, the difference signal representing a difference between the single frame of the video signal and an output of a smoothing filter which data representing the single frame of the video signal passes.

8. The computer readable medium of claim 7, wherein the program instructions for calculating a local gradient indicative of a region type includes,
   program instructions for defining a neighborhood of values around a current pixel value; and
   program instructions for quantifying a difference between each of the neighborhood of values and the current pixel value.

9. The computer readable medium of claim 7, wherein the program instructions for determining a weighting factor based upon the local gradient includes, program instructions for normalizing a difference between each of the neighborhood of values and the current pixel value.

10. The computer readable medium of claim 7, further comprising:
   program instructions for applying the smoothing filter to the video signal;
   program instructions for calculating the difference between the video signal and an output of the smoothing filter; and
   program instructions for representing the difference between the video signal and the output of the smoothing filter as the difference signal.

11. The computer readable medium of claim 7, further comprising:
   program instructions for receiving a signal to reduce a bit rate; and
   in response to receiving the signal the computer readable medium includes,
      program instructions for applying a smoothing filter to the video signal.

12. The computer readable medium of claim 7, wherein the program instructions for applying the weighting factor to a difference signal according to the region type includes,
   program instructions for constructing the weighting factor in a manner such that a higher weighting factor diminishes a contribution of a smoothing filter.

13. An integrated circuit, comprising:
   circuitry for filtering a signal prior to transmission to an encoding loop, the circuitry for filtering including,
   circuitry for calculating a gradient between a pixel value and a neighboring pixel value within a same frame of the signal;
   circuitry for determining a weight factor based upon the local gradient; and
   circuitry for applying the weight factor to a difference signal according to a region type associated with the local gradient, wherein the difference signal represents a difference between the single frame of the video signal and an output of a smoothing filter which data representing the single frame of the video signal passes, and wherein the region type is one of an edge region or a smooth region.

14. The integrated circuit of claim 13, wherein the circuitry for calculating a local gradient indicative of a region type includes,
   circuitry for defining a neighborhood of values around a current pixel value; and
   circuitry for quantifying a difference between each of the neighborhood of values and the current pixel value.

15. The integrated circuit of claim 13, wherein the circuitry for determining a weight factor based upon the local gradient includes,
   circuitry for normalizing a difference between each of the neighborhood of values and the current pixel value.

16. The integrated circuit of claim 13, further comprising:
   circuitry for applying a smoothing filter to the video signal;
   circuitry for calculating a difference between the video signal and an output of the smoothing filter; wherein the difference between the video signal and the output of the smoothing filter represents the difference signal.

17. The integrated circuit of claim 13, further comprising:
   circuitry for receiving a signal to reduce a bit rate; and
   circuitry for applying a smoothing filter to the video signal.

18. The integrated circuit of claim 13, wherein the circuitry for applying the weight factor to a difference signal according to the region type includes,
   circuitry for constructing the weight factor in a manner such that a higher weight factor diminishes a contribution of a smoothing filter.

19. The method of claim 1, wherein the local gradient is calculated for a neighborhood of pixels proximate to a pixel within the single frame.

20. The computer readable medium of 7, wherein the local gradient is calculated for a neighborhood of pixels proximate to a pixel within the single frame.

21. The integrated circuit of claim 13, wherein the local gradient is calculated for a neighborhood of pixels proximate to a pixel within the single frame of the video signal.

* * * * *